(12) United States Patent
Shperling et al.

(10) Patent No.: US 9,504,058 B2
(45) Date of Patent: Nov. 22, 2016

(54) METHODS AND SYSTEMS FOR SCHEDULING TRANSMISSION OF UPLINK COMMUNICATION

(71) Applicant: MOTOROLA SOLUTIONS, INC, Schaumburg, IL (US)

(72) Inventors: Itzhak Shperling, Bnei-Brak (IL); Eitan Koren, Raanana (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 138 days.

(21) Appl. No.: 14/575,255

(22) Filed: Dec. 18, 2014

(65) Prior Publication Data

US 2016/0183288 A1 Jun. 23, 2016

(51) Int. Cl.
*H04W 72/12* (2009.01)
*H04W 72/04* (2009.01)

(52) U.S. Cl.
CPC ..... *H04W 72/1215* (2013.01); *H04W 72/0446* (2013.01)

(58) Field of Classification Search
CPC ..................... H04W 72/1268; H04W 72/0446
USPC ....... 370/310, 328, 329, 345, 347, 348, 431, 370/432; 455/403, 422.1, 450, 39, 500, 455/507, 509
See application file for complete search history.

(56) References Cited

U.S. PATENT DOCUMENTS

| | | | |
|---|---|---|---|
| 6,643,522 B1 | 11/2003 | Young | |
| 8,526,947 B1 | 9/2013 | Shahaf et al. | |
| 8,730,990 B2 | 5/2014 | Ghosh et al. | |
| 2004/0002334 A1* | 1/2004 | Lee ................... | H04W 36/0083 455/436 |
| 2004/0224677 A1 | 11/2004 | Kuchibhotla et al. | |
| 2008/0101279 A1 | 5/2008 | Russell et al. | |
| 2013/0331090 A1 | 12/2013 | Kim et al. | |
| 2014/0247732 A1* | 9/2014 | Yang ................. | H04W 36/0088 370/252 |
| 2015/0092544 A1* | 4/2015 | De Pasquale ......... | H04W 16/14 370/230 |

FOREIGN PATENT DOCUMENTS

| | | | |
|---|---|---|---|
| AU | 2010349742 A1 | 10/2012 | |
| AU | 2009335873 B2 | 5/2014 | |

\* cited by examiner

*Primary Examiner* — Obaidul Huq

(57) ABSTRACT

Disclosed herein are methods and systems for scheduling transmission of uplink communication. One embodiment takes the form of a process carried out by a first-radio-access-network-(RAN) entity in a first RAN, where the first RAN has a first-RAN uplink that is time-synchronized with a second-RAN uplink of a second RAN. The first-RAN entity detects an uplink-scheduling event associated with a mobile radio, and the first-RAN entity also identifies a second-RAN-uplink-transmission time slot for the mobile radio. The first-RAN entity schedules the mobile radio to transmit first-RAN-uplink communication, which is associated with the detected uplink-scheduling event, during a first-RAN-uplink time slot that does not overlap the identified second-RAN-uplink-transmission time slot.

19 Claims, 7 Drawing Sheets

METHODS AND SYSTEMS FOR SCHEDULING TRANSMISSION OF UPLINK COMMUNICATION

BACKGROUND OF THE INVENTION

Wireless-communication devices (hereinafter "mobile radios") such as cell phones, smart phones, and mobile Wi-Fi hotspots are generally configured with the ability to obtain one or more types of wireless service. Such service could take the form of telephony service and/or data service (e.g., Internet connectivity), among other forms of service. These services are typically obtained via a radio access network (RAN). Well known examples of such RANs include land mobile radio (LMR) networks, Association of Public-Safety Communications Officials-International (APCO) Project 25 (P25) networks, Terrestrial Trunked Radio (TETRA) networks, Long-Term Evolution (LTE) networks, Global System for Mobile Communications (GSM) networks, CDMA2000 networks, and IEEE 802.11 (Wi-Fi) networks, among other examples that could be listed here.

Some mobile radios are equipped and configured to be able to communicate with multiple RANs—for example, with both a P25 network and an LTE network. It occurs in some instances that, when a given mobile radio is communicating with multiple RANs (e.g., simultaneously transmitting to multiple RANs), that given mobile radio may incur certain negative effects, some examples including excessive battery drain, battery current overload, and interference between radio-frequency (RF) communications with the respective RANs, among other examples that could be listed here. Accordingly, for this reason and others, there is a need for the presently disclosed methods and systems for scheduling transmission of uplink communication.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
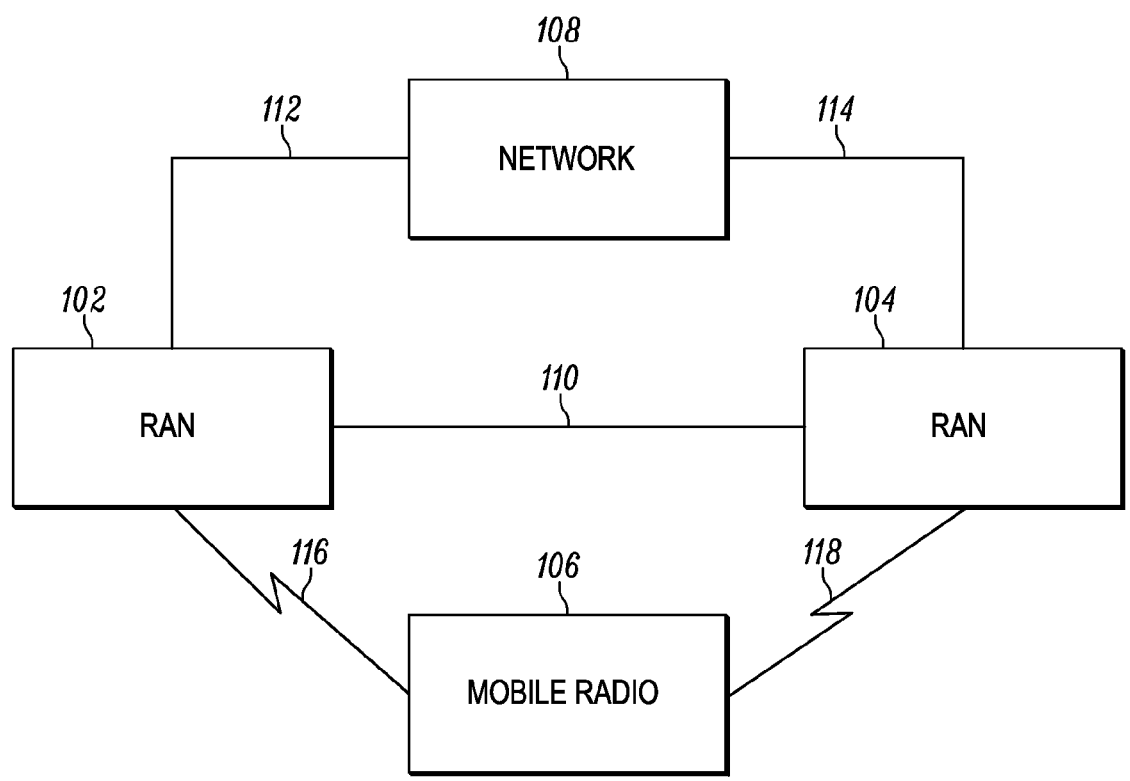
FIG. 1 depicts an example communication system, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for scheduling transmission of uplink communication. At least one embodiment takes the form of a process carried out by a first-RAN entity in a first RAN. The first RAN has a first-RAN uplink that is time-synchronized with a second-RAN uplink of a second RAN. The first-RAN entity detects an uplink-scheduling event associated with a mobile radio, and identifies a second-RAN-uplink-transmission time slot for the mobile radio. The first-RAN entity further schedules the mobile radio to transmit first-RAN-uplink communication during a first-RAN-uplink time slot that does not overlap the identified second-RAN-uplink-transmission time slot. The first-RAN-uplink communication is associated with the detected uplink-scheduling event.

At least one embodiment takes the form of a first-RAN entity that includes a communication interface, a processor, and data storage containing instructions executable by the processor for causing the first-RAN entity to carry out at least the functions described in the preceding paragraph.

Moreover, any of the variations and permutations that are described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

In at least one embodiment, the first RAN and/or the second RAN takes the form of an LTE network and/or a P25 network.

In at least one embodiment, the first-RAN uplink includes first-RAN-uplink time slots and the second-RAN uplink includes second-RAN-uplink time slots; and the first-RAN uplink being time-synchronized with the second-RAN uplink includes each second-RAN-uplink time slot being coterminous with a set of contiguous first-RAN-uplink time slots.

In at least one embodiment, each set of contiguous first-RAN-uplink time slots is a set of sixty 0.5-millisecond first-RAN-uplink time slots organized as three 10-millisecond frames (e.g., LTE-FDD (LTE-Frequency Division Duplex) frames), each 10-millisecond frame containing ten 1-millisecond sub-frames, each 1-millisecond sub-frame containing two 0.5-millisecond first-RAN-uplink time slots.

In at least one embodiment, the second-RAN-uplink time slots are 30-millisecond second-RAN-uplink time slots.

In at least one embodiment, the first-RAN uplink becomes time-synchronized with the second-RAN uplink at least in part by the first-RAN entity adjusting the first-RAN uplink such that each set of contiguous first-RAN-uplink time slots is coterminous with a respective second-RAN-uplink time slot. In at least one such embodiment, adjusting the first- RAN uplink includes the first-RAN entity adjusting respective boundaries of the first-RAN-uplink time slots based at least in part on respective boundaries of the second-RAN-uplink time slots.

In at least one embodiment, the first-RAN uplink becomes time-synchronized with the second-RAN uplink at least in part by the first-RAN entity sending a request to the second RAN to adjust the second-RAN uplink such that each second-RAN-uplink time slot is coterminous with a respective set of contiguous first-RAN-uplink time slots. In at least one such embodiment, the request to adjust the second-RAN uplink takes the form of (or includes) a request to adjust respective boundaries of the second-RAN-uplink time slots based at least in part on respective boundaries of the first-RAN-uplink time slots.

In at least one embodiment, detecting the uplink-scheduling event associated with the mobile radio includes receiving an uplink-scheduling request from the mobile radio.

In at least one embodiment, detecting the uplink-scheduling event associated with the mobile radio includes making a determination to request uplink communication from the mobile radio.

In at least one embodiment, identifying the second-RAN-uplink-transmission time slot includes receiving an indication of the second-RAN-uplink-transmission time slot from the second RAN. In at least one such embodiment, the first RAN is connected to the second RAN via a communication link, and receiving the indication of the second-RAN-uplink-transmission time slot from the second RAN includes receiving the indication of the second-RAN-uplink-transmission time slot from the second RAN over the communication link. In at least one such embodiment, the communication link takes the form of (or includes) an Internet Protocol (IP)-based communication link.

In at least one embodiment, identifying the second-RAN-uplink-transmission time slot includes receiving an identification of the second-RAN-uplink-transmission time slot from the mobile radio.

In at least one embodiment, the first-RAN entity detects a second-RAN-uplink transmission by the mobile radio, and identifies the second-RAN-uplink-transmission time slot based on a timing of the detected second-RAN-uplink transmission.

At least one embodiment takes the form of a process carried out by a mobile radio. The mobile radio detects an uplink-scheduling event associated with a first RAN, where the first RAN has a first-RAN uplink that is time-synchronized with a second-RAN uplink of a second RAN. The mobile radio identifies a second-RAN-uplink-transmission time slot for the mobile radio, and transmits to the first RAN an indication of the identified second-RAN-uplink-transmission time slot. The mobile radio subsequently receives, from the first RAN, a first-RAN-uplink scheduling directive that schedules the mobile radio to transmit first-RAN-uplink communication during a first-RAN-uplink time slot that does not overlap the identified second-RAN-uplink-transmission time slot. The mobile radio transmits first-RAN-uplink communication to the first RAN in accordance with the received scheduling directive.

At least one embodiment takes the form of a mobile radio that includes a communication interface, a processor, and data storage containing instructions executable by the processor for causing the mobile radio to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any system embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts an example communication system, in accordance with at least one embodiment. In particular, FIG. 1 depicts an example communication system 100 that includes RANs 102 and 104, a mobile radio 106, and a network 108. Those of skill in the art will appreciate that communication system 100 may contain different and/or additional elements. For example, network 108 may not be present in some embodiments.

Mobile radio 106 may be any suitable computing and communication device configured to engage in wireless communication with one or more RANs (such as RAN 102 and/or 104) via one or more communication links (such as air interface 116 and/or 118, respectively), as is known to those in the relevant art. In addition to the examples provided above, mobile radio 106 could take the form of a tablet computer, a walkie-talkie, and/or any combination of these, among numerous other possibilities, and could be handheld (as may be the case for a walkie-talkie), body-mounted, or attached to a vehicle (such as the roof of a car), as examples. Moreover, mobile radio 106 may include a user interface (including elements such as a touchscreen, keyboard, microphone, speakers, and the like) via which a user may interact with the mobile radio.

RAN 102 and/or 104 may be any RAN equipped and configured by those of skill in the relevant art to function as described herein. In different embodiments, either (or both) of RANs 102 and 104 could take the form of (or include) a base station, a subpart of a RAN, and/or a wireless wide area network (WWAN), as a few representative examples. RANs 102 and 104 could be controlled by a common network operator and/or by respectively different network operators, and could take the form of (or at least include) respective public-safety RANs and/or commercial RANs, as examples. The respective coverage areas of RANs 102 and 104 may overlap, possibly allowing dual-mode mobile radios in an overlapping area to communicate with both of RANs 102 and 104.

RAN 102 and RAN 104 may each communicate with mobile radio 106 over respective air interfaces 116 and 118 according to a protocol such as LMR, APCO P25, TETRA, LTE, GSM, CDMA2000, Wi-Fi, and/or the like. In at least one embodiment, RAN 102 and/or RAN 104 takes the form of (or includes) an LTE network and/or an APCO P25 network. These examples are provided for illustration and not by way of limitation; moreover, those of skill in the relevant art are aware of variations among different protocols and among different network implementations of a given protocol, and of similarities across different protocols.

Air interface 116 and/or 118 may include a respective downlink and a respective uplink. A given downlink and/or uplink may take the form of a respective air-interface channel and could be modulated using Frequency Modulation (FM) and/or Quadrature Phase-Shift Keying (QPSK), among numerous other examples known to those of skill in the relevant art. A respective downlink channel could (though need not) take the form of a shared channel, and could provide one or more of a circuit-mode-data service, a packet-mode-data service, and/or a Short Data Service (SDS) (i.e., a Short Message Service (SMS)), among numerous other examples known to those of skill in the relevant art. Communication over a given channel may be addressed to a single mobile radio using an identifier uniquely associated with that single mobile radio and/or to multiple mobile radios. Either or both of air interfaces 116 and 118 could take the form of (or include) respective half-duplex links (e.g., simplex links).

In the embodiment that is depicted in FIG. 1, RANs 102 and 104 are communicatively connected via a communication link 110 and via respective communication links 112 and 114 to network 108. Any of communication links 110-114 could include one or more communication devices, networks, connections, switches, bridges, routers, and the like, and could make use of wired and/or wireless forms of communication. Moreover, one or more communication links could be present instead of and/or in addition to one or more of communication links 110-114. Network 108 could take the form of or include a circuit-switched network (such as the Public Switched Telephone Network (PSTN)), a packet-switched network (such as the Internet), and/or any other suitable network or networks, and any of communication links 110-114 could take the form of (or include) an Signaling System No. 7 (SS7) communication link, and Asynchronous Transfer Mode (ATM) communication link, and/or IP-based communication link, among numerous other example possibilities that could be listed here, and that are known to those having skill in the relevant art.

Figure 2:
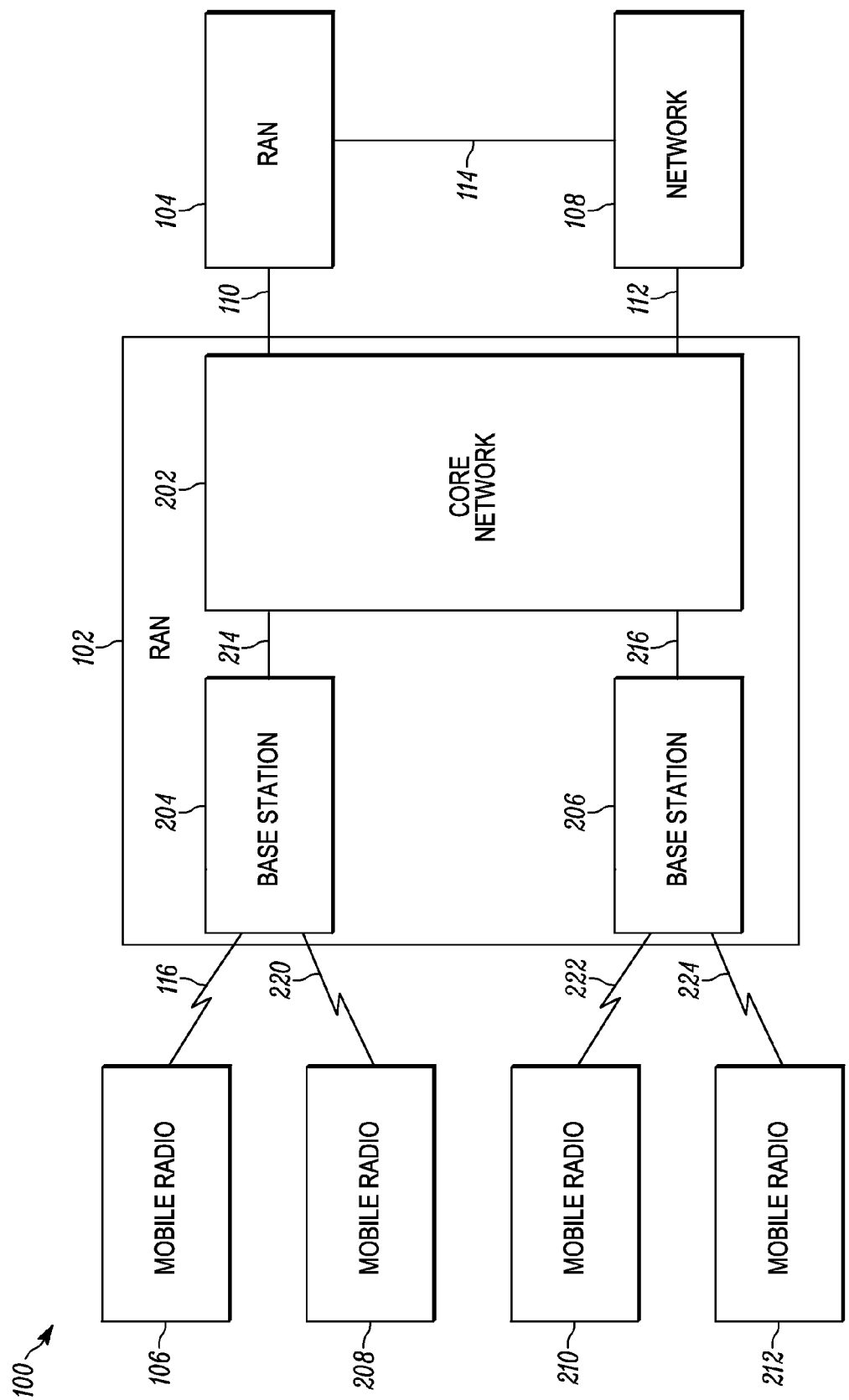
FIG. 2 depicts an example radio access network (RAN) in the context of the example communication system of FIG. 1, in accordance with at least one embodiment.

FIG. 2 depicts an example radio access network (RAN) in the context of the example communication system of FIG. 1, in accordance with at least one embodiment. In the embodiment that is depicted in FIG. 2, RAN 102 includes a core network 202 and base stations 204 and 206 that are communicatively connected to core network 202 via respective communication links 214 and 216. Those of skill in the art will appreciate that RAN 102 may include additional and/or different entities, and that RAN 104 may take a form similar to that of RAN 102.

Core network 202 may include one or more network entities such as one or more mobility management entities (MMES), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to mobile radios 106 and additional example mobile radios 208-212 via one or more of base stations 204 and 206, and to bridge such wireless service with various transport networks.

In general, base stations 204 and 206 may be any entities that, on one side (i.e., the wireless-network side (interface)), engage in wireless communication over respective air interfaces with one or more mobile radios (e.g., communication over air interfaces 116 and 220-224 with mobile radios 106 and 208-212, respectively) according to a protocol (several examples of which are described throughout this detailed description) and, on the other side (i.e., the "backhaul" side), engage in communication with core network 202 via one or more respective communication links 214 and 216, thereby facilitating communication between various mobile radios (such as mobile radios 106 and 208-212) and various networks and/or network entities (such as RAN 104 and/or network 108, among other examples). As is the case with each of the links mentioned above, and as is the case with any of the communication links mentioned anywhere else in this disclosure, either or both of communication links 214 and 216 may take the form of (or include) one or more wireless-communication links and/or one or more wired-communication links, as deemed suitable by those of skill in the relevant art in a given context.

In at least one embodiment, either or both of base station 204 and base station 206 includes any hardware and/or software necessary for the base station to function as a NodeB, an eNodeB, a base transceiver station (BTS), a Wi-Fi access point, and/or any other type of base station, as known to those having skill in the relevant art. In some instances, either or both of base station 204 and base station 206 may also include functionality typically associated in the art with entities that are often referred to by terms such as base station controllers (BSCs), radio network controllers (RNCs), and the like. Moreover, while two base stations 204 and 206 are depicted in FIG. 2, a different number of base stations could be present in a given implementation.

Figure 3:
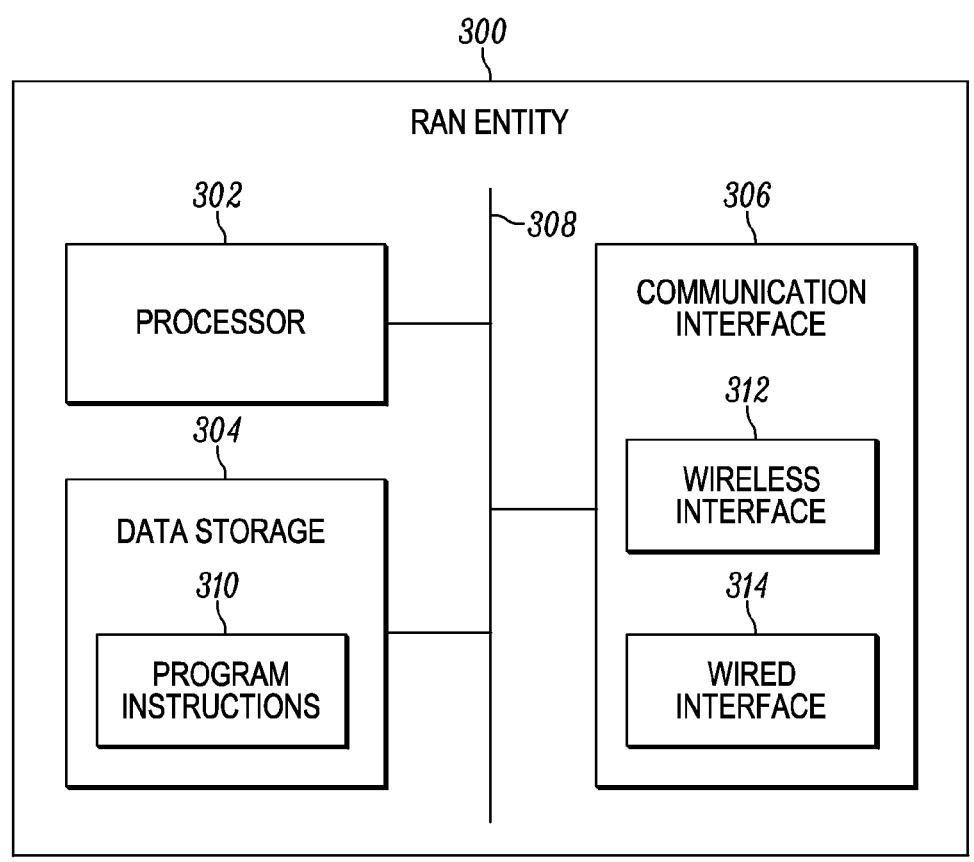
FIG. 3 depicts structural elements of an example RAN entity, in accordance with at least one embodiment.

FIG. 3 depicts structural elements of an example RAN entity, in accordance with at least one embodiment. In particular, in the depicted embodiment, the example RAN entity 300 includes a processor 302, a data storage 304, and a communication interface 306, all of which are interconnected via a system bus 308. Those having skill in the relevant art will appreciate that the example first-RAN entity 300 could have additional and/or different components, and perhaps a different arrangement of components, among many other possible variations that could be listed here. Moreover, while depicted and described as being interconnected via a system bus 308, the various components of the example RAN entity 300 could be interconnected via another suitable communication link, network, or the like. Additionally, in various different embodiments, the example RAN entity 300 may take the form of a single device (e.g., a single server) or a combination of devices, as deemed suitable by those in the art.

Processor 302 may include one or more processors of any type deemed suitable by those of skill in the relevant art, some examples including a microprocessor and a dedicated digital signal processor (DSP).

Data storage 304 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, data storage 304 contains program instructions 310 executable by processor 302 for carrying out various functions, though data storage 304 may contain different and/or additional data. In an embodiment in which the example RAN entity 300 is configured to carry out one or more processes and/or functions (such as the processes and functions described below with reference to FIG. 5), program instructions 310 are executable by processor 302 for carrying out those functions. In instances where other entities described herein have a structure similar to that depicted in and described in connection with FIG. 3, the respective program instructions 310 stored by the respective data storages 304 of those respective devices are executable by their respective processors 302 to carry out functions respectively performed by those devices.

Communication interface 306 (which, in the depicted embodiment, includes wireless-communication interface 312 and wired-communication interface 314) may include any necessary hardware (e.g., chipsets, antennas, Ethernet cards, and the like), any necessary firmware, and/or any necessary software for conducting one or more forms of communication. Wireless-communication interface 312 may be configured to communicate according to one or more of the wireless-communication types and/or protocols mentioned above, and/or one or more other types and/or protocols deemed suitable by those having skill in the relevant art for a given implementation or in a given context. Similarly, wired-communication interface 314 may be configured to communicate according to one or more communication types and/or protocols such as Ethernet, Universal Serial Bus (USB), and the like, and/or one or more other types and/or protocols deemed suitable by those having skill in the relevant art for a given implementation or in a given context. And though communication interface 306 is depicted in FIG. 3 as including both wireless-communication interface 312 and wired-communication interface 314, those having skill in the relevant art will appreciate that communication interface 306 may contain different and/or additional interfaces.

Those having skill in the relevant art will further appreciate that any one or more entities within RAN 102 (such as core network 202, base station 204, and/or base station 206), any entities connected to RAN 102 (such as any of mobile radios 106 and 208-212), and/or any other network entities could take a form similar to that of example RAN entity 300 as depicted in FIG. 3. As stated, RAN entity 300 may be a single device located within RAN 102, such as in the core network 202 or at one of the base stations 204 or 206, or may take the form of a distributed computing device whose functionality is divided across multiple devices. In still further embodiments, RAN entity 300 may be located in one of the external networks set forth above, such as network 108, and may be accessible via RAN 102. And certainly other implementations are possible.

Figure 4:
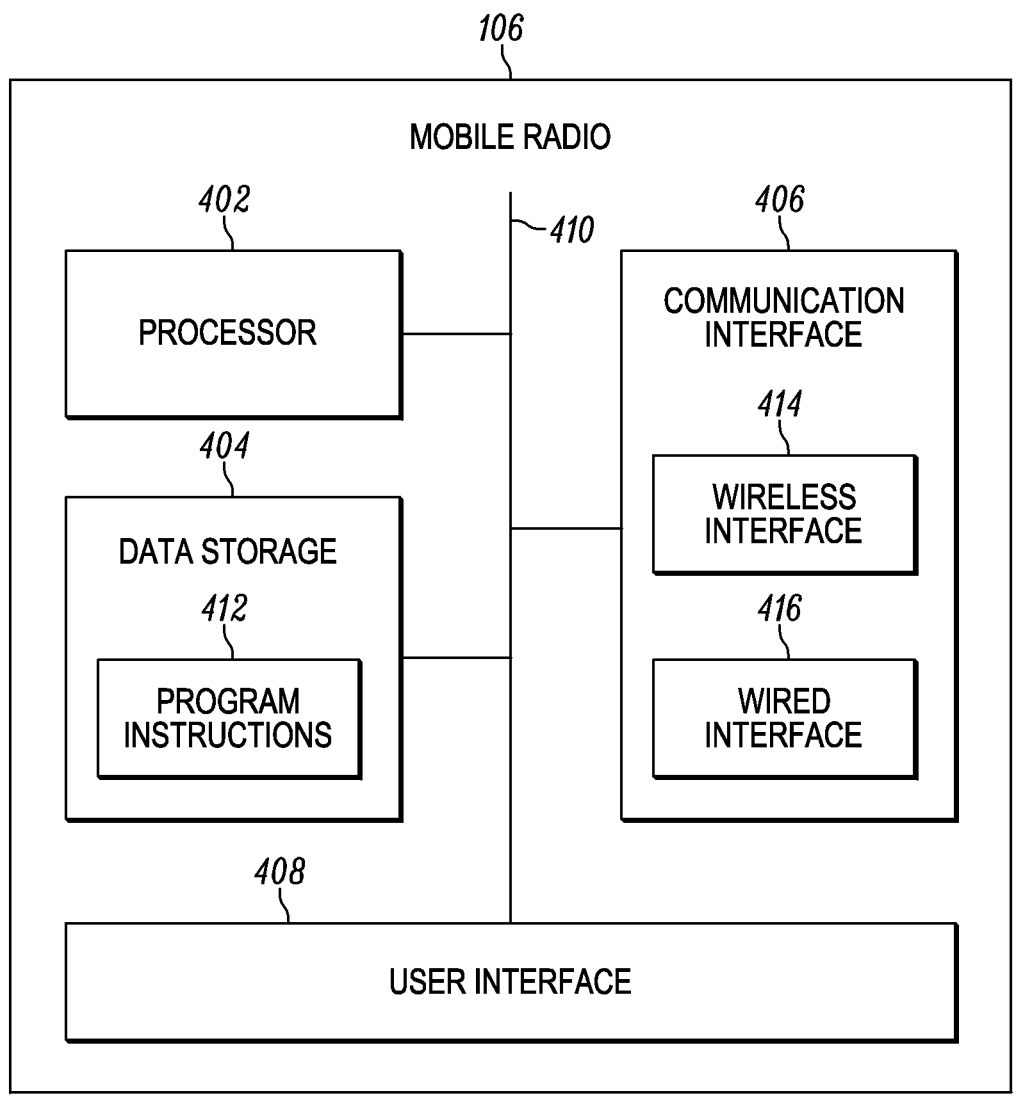
FIG. 4 depicts structural elements of an example mobile radio, in accordance with at least one embodiment.

FIG. 4 depicts structural elements of an example mobile radio, in accordance with at least one embodiment. In particular, in the depicted embodiment, the example mobile radio 106 includes a processor 402, data storage 404 containing program instructions 412, and a communication interface 406 that includes a wireless-communication interface 414 and a wired-communication interface 416, all of which are interconnected via a system bus 410, and which may function in a manner similar to the similarly-named elements described above with reference to FIG. 3.

In the embodiment that is depicted in FIG. 4, mobile radio 106 further includes a user interface 408, which is interconnected with the above-described elements of mobile radio 106 via system bus 410. User interface 408 may include one or more displays, touchscreens, loudspeakers, microphones, dial keys, push-to-talk (PTT) buttons, switches, light emitting diodes (LEDs), and the like. And other user-interface components could be included in various different implementations. And those having skill in the relevant art will appreciate that mobile radio 106 could have additional and/or different components, and perhaps a different arrangement of components, and that other network entities could take a form similar to that of mobile radio 106 as depicted in and described in connection with FIG. 4.

Figure 5:
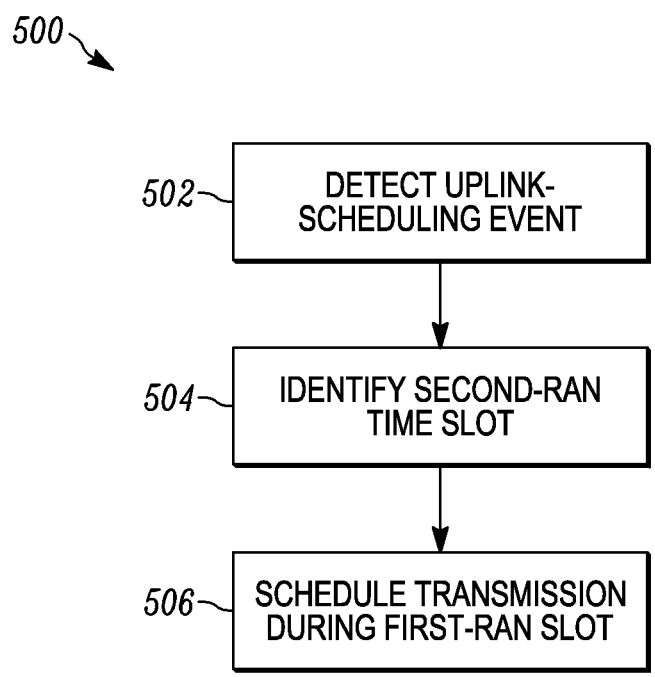
FIG. 5 depicts a first example process, described by way of example as being carried out by the example RAN entity of FIG. 3, in accordance with at least one embodiment.

FIG. 5 depicts a first example process, described by way of example as being carried out by the example RAN entity of FIG. 3, in accordance with at least one embodiment. And although the example process 500 of FIG. 5 is described herein as being carried out by RAN entity 300, this is by way of example and not limitation, as any suitably equipped, programmed, and configured device or system of devices could carry out the process 500.

As shown, process 500 begins at step 502 with RAN entity 300 detecting an uplink-scheduling event associated with mobile radio 106. At step 504, RAN entity 300 identifies a RAN-104-uplink-transmission time slot for mobile radio 106 and, at step 506, RAN entity 300 schedules mobile radio 106 to transmit RAN-102-uplink communication during a RAN-102-uplink time slot that does not overlap the identified RAN-104-uplink-transmission time slot. RAN 102 has an uplink that is time-synchronized with an uplink of RAN 104, and the scheduled RAN-102-uplink communication is associated with the detected uplink-scheduling event.

Figure 6:
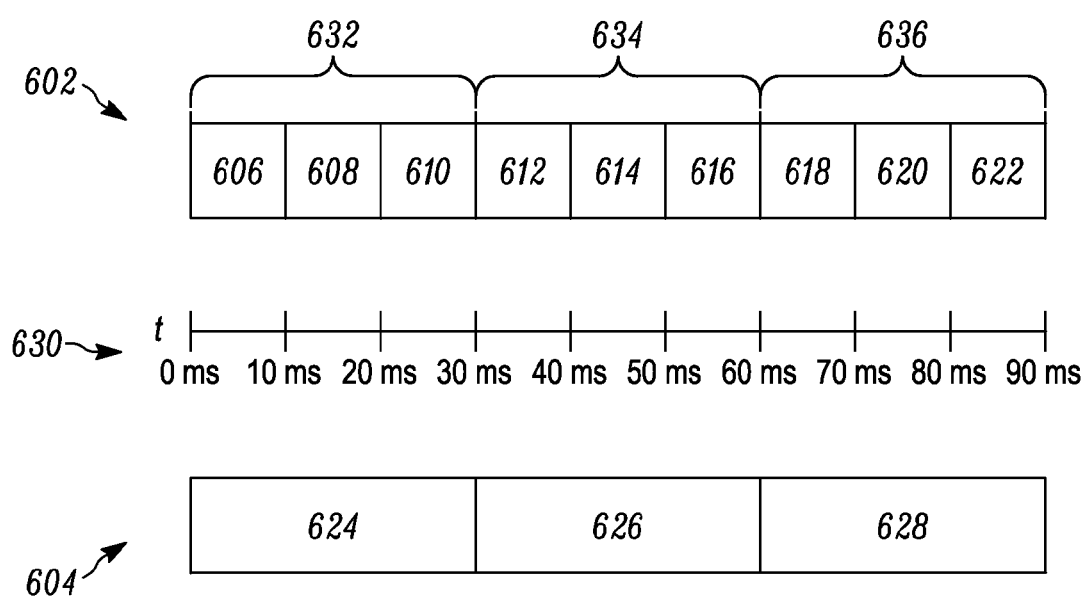
FIG. 6 depicts an example timing diagram, in accordance with at least one embodiment.

FIG. 6 depicts an example timing diagram, in accordance with at least one embodiment. In particular, FIG. 6 depicts an example timing diagram 600, and what follows is a description of an example execution of process 500 that uses timing diagram 600 for illustration as an example context. As can be seen in FIG. 6, timing diagram 600 includes a RAN-102 uplink 602 and a RAN-104 uplink 604. In the depicted embodiment, RAN-102 uplink 602 includes RAN-102-uplink frames (e.g., LTE-FDD frames) 606-622, while RAN-104 uplink 604 includes RAN-104-uplink time slots 624, 626, and 628. RAN-102 uplink 602 and RAN-104 uplink 604 are respectively depicted above and below a time axis 630, which is divided in to increments of 10 milliseconds (ms). And while in at least one embodiment the RAN 102 is an LTE-FDD network, in at least one other embodiment the RAN 102 is an LTE-TDD network. Both types of LTE networks typically utilize 10-ms frames, though within those frames, the structure of the sub-frames and time slots varies.

As stated, in the depicted embodiment, RAN 102 is an LTE-FDD network and RAN 104 is a P25 network. Each RAN-102-uplink frame 606-622 is a 10-ms frame (which is a typical length for LTE-FDD-network frames), and each RAN-104-uplink time slot 624-628 is a 30-ms time slot (which is a typical length for P25-network time slots). It can be seen that each 30-ms RAN-104-uplink time slot is coterminous with a set of three contiguous 10-ms RAN-102-uplink frames: RAN-104-uplink time slot 624 is coterminous with a set 632 of contiguous RAN-102-uplink frames 606-610, RAN-104-uplink time slot 626 is coterminous with a set 634 of contiguous RAN-102-uplink frames 612-616, and RAN-104-uplink time slot 628 is coterminous with a set 636 of contiguous RAN-102-uplink frames 618-622. Moreover, it is noted that, in at least one embodiment, each 10-ms RAN-102-uplink frame 606-622 contains ten 1-millisecond sub-frames, and that each such 1-millisecond sub-frame contains two 0.5-ms RAN-102-uplink time slots that are available for transmission. Thus, the coterminous alignment of the 30-ms RAN-104-uplink time slots with respective sets of three contiguous 10-ms RAN-102-uplink frames is also coterminous alignment of the respective 30-ms RAN-104-uplink time slots with respective sets of sixty contiguous 0.5-ms RAN-102-uplink time slots. This is all provided by way of example for illustration and not by way of limitation, and certainly it is the case that other embodiments and other implementations may differ with respect to the duration of frames, sub-frames, time slots, and/or the like in one or both RANs, and accordingly may differ as to the number of contiguous time slots in one of the RANs that are coterminous with each time slot in the other.

In this example, at step 502, RAN entity 300 receives, from mobile radio 106, a request for allocation of one or more RAN-102-uplink time slots during which mobile radio 106 may transmit RAN-102-uplink communication to RAN 102. The request indicates that RAN-104-uplink time slot 626 is allocated to mobile radio 106 for transmission of RAN-104-uplink communication to RAN 104 and, at step 504, RAN entity 300 identifies the indicated time slot as a RAN-104-uplink-transmission time slot. RAN-104-uplink-transmission time slot 626 is coterminous with set 634 of RAN-102-uplink frames 612-616. RAN entity 300 accordingly selects one or more RAN-102-uplink time slots that that do not overlap set 634—e.g., one or more of the 0.5-ms RAN-102-uplink time slots that are contained within RAN-102-uplink frames 606-610 (preceding set 634) and/or one or more of the 0.5-ms RAN-102-uplink time slots that are contained within RAN-102-uplink frames 618-622 (following set 634). In this example, RAN entity 300 selects a 0.5-ms RAN-102-uplink time slot that is contained within RAN-102-uplink frame 620 and, at step 506, schedules mobile radio 106 to transmit RAN-102-uplink communication to RAN 102 during the selected time slot.

RAN-102 uplink 602 being time-synchronized with RAN-104 uplink 604 may include each of the 30-ms RAN-104-uplink time slots 624-628 being coterminous with a set of contiguous 0.5-ms RAN-102-uplink time slots that are contained within RAN-102-uplink frames 606-622. Though FIG. 6 depicts each 30-ms RAN-104-uplink time slot as being coterminous with three contiguous 10-ms RAN-102-uplink frames, those of skill in the art will appreciate that the RAN-102-uplink time slots and/or RAN-104-uplink time slots may be different lengths, and that each set of contiguous RAN-102-uplink time slots could include additional and/or fewer time slots.

RAN-102 uplink 602 may need to be time-synchronized with RAN-104 uplink 604 before RAN entity 300 can schedule mobile radio 106 to transmit during a given RAN-102-uplink time slot. RAN-102 uplink 602 may become time-synchronized with RAN-104 uplink 604 at least in part by RAN entity 300 adjusting RAN-102 uplink 602 such that each set 632-636 of contiguous RAN-102-uplink frames 606-622 is coterminous with a respective RAN-104-uplink time slot from among RAN-104-uplink time slots 624-628. Adjusting RAN-102 uplink 602 could include RAN entity 300 adjusting respective boundaries of RAN-102-uplink frames 606-622 based at least in part on respective boundaries of RAN-104-uplink time slots 624-628. Such adjustments to the respective boundaries could include, for example, increasing and/or decreasing the respective lengths of RAN-102-uplink frames 606-622 and/or shifting the boundaries of the respective RAN-102-uplink frames along time axis 630, among other examples.

As another possibility, RAN-102 uplink 602 may become time-synchronized with RAN-104 uplink 604 at least in part by RAN entity 300 sending a request to RAN 104 to adjust RAN-104 uplink 604 such that each RAN-104-uplink time slot 624-628 is coterminous with a respective set of contiguous RAN-102-uplink frames 606-622. The request to adjust RAN-104 uplink 604 could take the form of (or include) a request to adjust respective boundaries of RAN-104-uplink time slots 624-628 based at least in part on respective boundaries of RAN-102-uplink frames 606-622. The requested adjustments to the respective boundaries could take a form similar to the adjustments to the respective boundaries of RAN-104-uplink time slots 624-628 described above, among other possibilities. Those of skill in the art will appreciate that RAN-102 uplink 602 may become time-synchronized with RAN-104 uplink 604 by any combination of these examples, among other possibilities.

Detecting the uplink-scheduling event associated with mobile radio 106 could include RAN entity 300 receiving an uplink-scheduling request from mobile radio 106. Additionally or alternatively, detecting the uplink-scheduling event associated with mobile radio 106 could include RAN entity 300 making a determination to request uplink communication from mobile radio 106. Those of skill in the art will appreciate that detecting the uplink-scheduling event could take other forms as well.

Identifying the RAN-104-uplink-transmission time slot could include RAN entity 300 receiving an identification of the RAN-104-uplink-transmission time slot from mobile radio 106. The identification could be included in an uplink-scheduling request received from mobile radio 106. The identification could be included in communication from mobile radio 106 other than the uplink-scheduling request; i.e., although an example uplink-scheduling request described above includes an indication that a given RAN-104-uplink time slot is allocated to mobile radio 106 for transmission of RAN-104-uplink communication to RAN 104, those of skill in the art will appreciate that the uplink-scheduling request need not contain such an indication. Other variations of identifying the RAN-104-uplink-transmission time slot are possible as well.

As another possibility, identifying the RAN-104-uplink-transmission time slot could include RAN entity 300 receiving an indication of the RAN-104-uplink-transmission time slot from RAN 104. In at least one embodiment, RAN 102 is connected to RAN 104 via communication link 110, and receiving the indication of the RAN-104-uplink-transmission time slot from RAN 104 includes RAN entity 300 receiving the indication of the RAN-104-uplink-transmission time slot from RAN 104 over communication link 110. As still another possibility, RAN entity 300 may detect a RAN-104-uplink transmission by mobile radio 106, and identify the RAN-104-uplink-transmission time slot based on a timing of the detected RAN-104-uplink transmission. Those of skill in the art will appreciate that RAN 102 may identify the RAN-104-uplink-transmission time slot by any combination of these (and/or other) examples.

Figure 7:
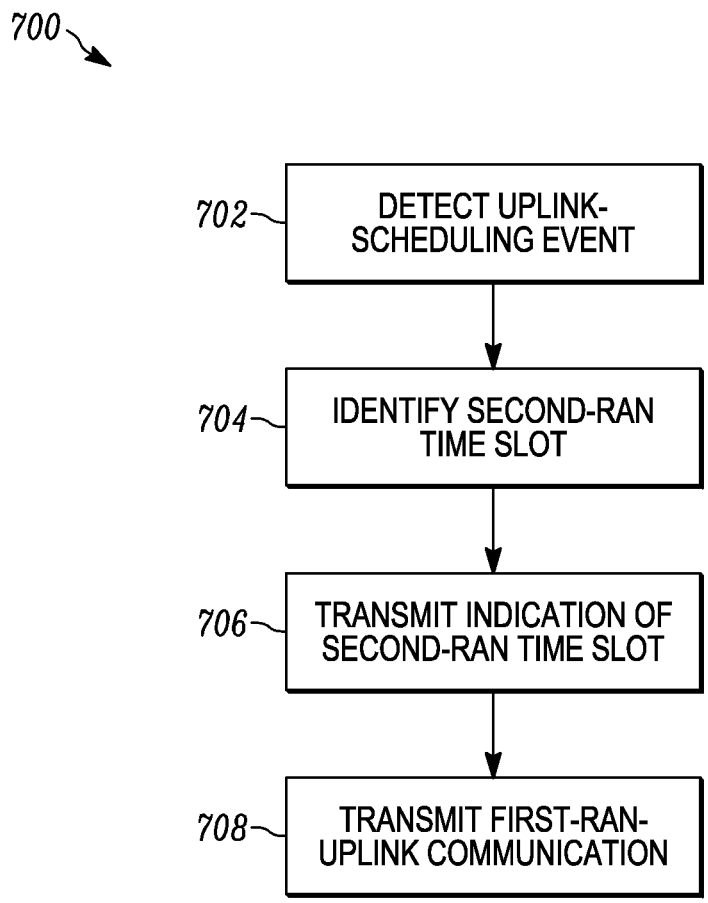
FIG. 7 depicts a second example process, described by way of example as being carried out by the example mobile radio of FIG. 4, in accordance with at least one embodiment.

FIG. 7 depicts a second example process, described by way of example as being carried out by the example mobile radio of FIG. 4, in accordance with at least one embodiment. And although the example process 700 of FIG. 7 is described herein as being carried out by mobile radio 106, this is by way of example and not limitation, as any suitably equipped, programmed, and configured device or system of devices could carry out the process 500.

As shown, process 700 begins at step 702, with mobile radio 106 detecting an uplink-scheduling event associated with RAN 102, which has an uplink that is time-synchronized with an uplink of RAN 104. Detecting the uplink-scheduling event associated with RAN 102 could include mobile radio 106 receiving an uplink-communication request from RAN 102 (e.g., a request for a received signal strength indication (RSSI) of air interface 116 as measured by mobile radio 106) and/or making a determination to send uplink communication to RAN 102.

At step 704, mobile radio 106 identifies a RAN-104-uplink-transmission time slot for mobile radio 106, which could include mobile radio 106 receiving an identification of the RAN-104-uplink-transmission time slot from RAN 104, among other examples described herein. At step 706, mobile radio 106 transmits, to RAN 102, an indication of the identified RAN-104-uplink-transmission time slot, and subsequently receives, from RAN 102, a RAN-102-uplink scheduling directive that schedules mobile radio 106 to transmit RAN-102-uplink communication during a RAN-102-uplink time slot that does not overlap the identified RAN-104-uplink-transmission time slot. And at step 708, mobile radio 106 transmits RAN-102-uplink communication to RAN 102 in accordance with the received scheduling directive.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method carried out by a first-radio-access-network-(RAN) entity in a first RAN, the first RAN having a first-RAN uplink that is time-synchronized with a second-RAN uplink of a second RAN, the method comprising:
   detecting an uplink-scheduling event associated with a mobile radio;
   identifying a second-RAN-uplink-transmission time slot for the mobile radio; and
   scheduling the mobile radio to transmit first-RAN-uplink communication during a first-RAN-uplink time slot that does not overlap the identified second-RAN-uplink-transmission time slot, the first-RAN uplink communication being associated with the detected uplink-scheduling event;
   wherein:
   the first-RAN uplink comprises first-RAN-uplink time slots and the second-RAN uplink coin second-RAN-uplink time slots, and
   the first-RAN uplink being time-synchronized with the second-RAN uplink comprises each second-RAN-uplink time slot being coterminous with a set of contiguous first-RAN-uplink time slots.

2. The method of claim 1, wherein at least one of the first RAN and the second RAN comprises a Long-Term Evolution (LTE) network.

3. The method of claim 1, wherein at least one of the first RAN and the second RAN comprises an Association of Public-Safety Communications Officials-International (APCO) Project 25 (P25) network.

4. The method of claim 1, wherein the second-RAN-uplink time slots are 30-millisecond second-RAN-uplink time slots.

5. The method of claim 1, wherein each set of contiguous first-RAN-uplink time slots is a set of sixty 0.5-millisecond first-RAN-uplink time slots organized as three 10-millisecond frames, each 10-millisecond frame containing ten 1-millisecond sub-frames, each 1-millisecond sub-frame containing two 0.5-millisecond first-RAN-uplink time slots.

6. The method of claim 5, wherein the second-RAN-uplink time slots are 30-millisecond second-RAN-uplink time slots.

7. The method of claim 1, wherein the first-RAN uplink becomes time-synchronized with the second-RAN uplink at least in part by the first RAN adjusting the first-RAN uplink such that each set of contiguous first-RAN-uplink time slots is coterminous with a respective second-RAN-uplink time slot.

8. The method of claim 7, wherein adjusting the first-RAN uplink comprises adjusting respective boundaries of the first-RAN uplink time slots based at least in part on respective boundaries of the second-RAN-uplink time slots.

9. The method of claim 1, wherein the first-RAN uplink becomes time-synchronized with the second-RAN uplink at least in part by the first RAN sending a request to the second RAN to adjust the second-RAN uplink such that each second-RAN-uplink time slot is coterminous with a respective set of contiguous first-RAN-uplink time slots.

10. The method of claim 9, wherein the request to adjust the second-RAN uplink comprises a request to adjust respective boundaries of the second-RAN-uplink time slots based at least in part on respective boundaries of the first-RAN-uplink time slots.

11. The method of claim 1, wherein detecting the uplink-scheduling event associated with the mobile radio comprises receiving an uplink-scheduling request from the mobile radio.

12. The method of claim 1, wherein detecting the uplink-scheduling event associated with the mobile radio comprises making a determination to request uplink communication from the mobile radio.

13. The method of claim 1, wherein identifying the second-RAN-uplink-transmission time slot comprises receiving an indication of the second-RAN-uplink-transmission time slot from the second RAN.

14. The method of claim 13, wherein the first RAN is connected to the second RAN via a communication link, wherein receiving the indication of the second-RAN-uplink-transmission time slot from the second RAN comprises the RAN receiving the indication of the second-RAN-uplink-transmission time slot from the second RAN over the communication link.

15. The method of claim 13, wherein the communication link comprises an IP-based communication link.

16. The method of claim 1, wherein identifying the second-RAN-uplink-transmission time slot comprises receiving an identification of the second-RAN-uplink-transmission time slot from the mobile radio.

17. The method of claim 1, further comprising detecting a second-RAN-uplink transmission by the mobile radio, wherein the first RAN identifies the second-RAN-uplink-transmission time slot based on a timing of the detected second-RAN-uplink transmission.

18. A first-radio-access-network-(RAN) entity in a first RAN, the first-RAN entity comprising:
a communication interface for providing a first-RAN uplink that is time-synchronized with a second-RAN uplink of a second RAN;
a processor; and
data storage containing instructions executable by the processor for causing the first RAN to carry out a set of functions, the set of functions including:
detecting an uplink-scheduling event associated with a mobile radio;
identifying a second-RAN-uplink-transmission time slot for the mobile radio; and
scheduling the mobile radio to transmit first-RAN-uplink communication during a first-RAN-uplink time slot that does not overlap the identified second-RAN-uplink-transmission time slot, the first-RAN-uplink communication being associated with the detected uplink-scheduling event wherein:
the first-RAN uplink comprises first-RAN-uplink time slots and the second-RAN uplink comprises second-RAN-uplink time slots, and
the first-RAN uplink being time-synchronized with the second-RAN uplink comprises each second-RAN-uplink time slot being coterminous with a set of contiguous first-RAN-uplink time slots.

19. A method carried out by a mobile radio, the method comprising:
detecting an uplink-scheduling event associated with a first radio access network (RAN), the first RAN having a first-RAN uplink that is time-synchronized with a second-RAN uplink of a second RAN;
identifying a second-RAN-uplink-transmission time slot for the mobile radio;
transmitting to the first RAN an indication of the identified second-RAN-uplink-transmission time slot, and subsequently receiving from the first RAN a first-RAN-uplink scheduling directive that schedules the mobile radio to transmit first-RAN-uplink communication during a first-RAN-uplink time slot that does not overlap the identified second-RAN-uplink-transmission time slot; and
transmitting first-RAN-uplink communication to the first RAN in accordance with the received scheduling directive wherein:
the first-RAN-uplink comprises first-RAN-uplink time slots and the second-RAN uplink comprises second-RAN-uplink time slots, and
the first-RAN uplink being time-synchronized with the second-RAN uplink comprises each second-RAN-uplink time slot being coterminous with a set of contiguous first-RAN-uplink time slots.

* * * * *